United States Patent
Rusan et al.

(10) Patent No.: US 7,626,798 B2
(45) Date of Patent: Dec. 1, 2009

(54) ELECTRONIC LOAD CONTROL UNIT (ELCU) USED AS BUS TIE BREAKER IN ELECTRICAL POWER DISTRIBUTION SYSTEMS

(75) Inventors: Ileana Rusan, Toronto (CA); David Lazarovich, Thornhill (CA); Srinivasa R. Dangeti, Razole (IN); Randy J. Fuller, Hillsburgh (CA); Edwin Yue, Unionville (CA)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 12/019,474

(22) Filed: Jan. 24, 2008

(65) Prior Publication Data

US 2009/0190279 A1 Jul. 30, 2009

(51) Int. Cl.
*H02H 7/00* (2006.01)
(52) U.S. Cl. ..................................... 361/93.6
(58) Field of Classification Search .................. 361/93, 361/62; 363/65
See application file for complete search history.

(56) References Cited

U.S. PATENT DOCUMENTS

| 4,380,725 | A | | 4/1983 | Sherman | |
| 4,403,292 | A | * | 9/1983 | Ejzak et al. | 700/297 |
| 5,422,778 | A | * | 6/1995 | Good et al. | 361/92 |
| 5,612,579 | A | * | 3/1997 | Wisbey et al. | 307/18 |
| 5,715,124 | A | * | 2/1998 | Votava et al. | 361/20 |
| 5,764,502 | A | * | 6/1998 | Morgan et al. | 363/65 |
| 6,320,732 | B1 | * | 11/2001 | Norman et al. | 361/62 |
| 6,369,549 | B1 | * | 4/2002 | Brefeld et al. | 322/11 |
| 7,177,125 | B2 | | 2/2007 | Lazarovich et al. | |
| 7,400,065 | B2 | * | 7/2008 | Michalko | 307/44 |

FOREIGN PATENT DOCUMENTS

WO   WO 98/34318   8/1998

* cited by examiner

*Primary Examiner*—Stephen W Jackson
*Assistant Examiner*—Angela Brooks
(74) *Attorney, Agent, or Firm*—Oral Caglar, Esq.

(57) ABSTRACT

The present invention provides an electrical power distribution system that includes a first primary distribution panel (PDP) connected to a first source of electrical power and a second PDP connected to a second source of electrical power. The second PDP is connected to the first PDP by a conductor. A first ELCU receives signals corresponding to the flow of current through the first PDP to a load. A second ELCU receiving signals corresponding to the flow of current between the first PDP and the second PDP and a third ELCU receives signals corresponding to the flow of current between the second PDP and the first PDP. The first, second and third ELCUs protect the electrical power distribution system from a variety of fault conditions.

20 Claims, 3 Drawing Sheets

ELECTRONIC LOAD CONTROL UNIT (ELCU) USED AS BUS TIE BREAKER IN ELECTRICAL POWER DISTRIBUTION SYSTEMS

BACKGROUND OF THE INVENTION

The present invention relates to electrical power distribution systems, and more particularly, to the control of bus tie breakers in electrical power distribution systems.

Conventional electrical power systems architecture, such as those used in aerospace applications, usually needs to be reconfigured in the event of a power source failure or interconnect cabling failures. In electrical power systems having multiple power sources, when one power source fails, power may be transferred to the distribution bus of the failed power source from another power source. Bus Tie Contactors (BTCs) are typically used to accomplish this transfer of power between busses fed by different sources of electrical power.

FIG. 1 shows a conventional electrical power distribution system 10 in accordance with the prior art. FIG. 1 shows the electrical power system 10 during normal mode of operation. Two electrical power sources 12, 14 are connected to electrical loads 16, 18 via distribution buses 24 and 26 located in power distribution panels 20, 22 respectively. The power sources 12, 14 may be, for example, electrical generators. Power bus bars 24, 26 connect the electrical power sources to the plurality of electrical loads 16, 18 through a plurality of Electrical Load Control Units, e.g., (ELCUs) 28, 30. The ELCUs 28, as well as circuit breakers (not shown) may be used to provide line protection for each load 16, 18.

In the electrical power distribution system 10 bus tie contactors (BTCs) 32, 34 are used to allow transfer of, or to isolate electrical power between, power bus bars 24, 26. The transfer may be performed by connecting ("tying") electrical power buses together through electrical connection 36, which may comprise a cable. The BTCs 32, 34 may be used to reconfigure the system under certain fault conditions to ensure the availability of power on both buses 24 and 26.

Electrical power system 10 may be a variable frequency or a constant frequency power system. In a variable frequency power system, the power sources 12, 14 are not synchronized and power buses cannot be tied together. During normal operation, as shown in FIG. 1, each power source 12, 14 delivers power to its own bus 24, 26 and the BTCs 32, 34 are de-activated (opened) to keep the generator channels separated. BTCs 32, 34 may be controlled by control logic in a bus power control unit (BPCU) hereinafter referred to as a CONTROL DEVICE 46, which senses current from current transformers (CTs) 48, 50.

FIG. 2 shows the state of the electrical power system 10 when the electrical source 12 has failed. Generator control units (GCUs) 38, 40 may be used to detect the failure of either the electrical source 12 or 14 respectively. Upon failure of electrical source 12, the associated GCU 38 will isolate the electrical source 12 by commanding a generator control breaker (GCB) 42 to open, thereby removing the power source 12 from the bus bar 24.

To ensure availability of power to the loads 16, connected to the "dead bus", the BTCs will be activated (closed) by signals from the CONTROL DEVICE 46, or by GCUs 38 and 40, as shown in FIG. 2. In this way, the unpowered bus bar 24 will be cross-fed by the active power source 14 which may supply the total power to both power bus bars 24, 26.

Likewise, in the case of a failure of power source 14, the associated GCU 40 may sense the failure and may command GCB 44 to open and thereby removing the power source 14 from the bus bar 26. CONTROL DEVICE 46 would also close both BTCs 32, 34 so that power source 12 may supply power to both power bus bars 24, 26.

FIG. 3 shows the electrical power system 10 in the situation where there has been a subsequent power bus fault. In particular, as shown in FIG. 3, power bus bar 24 has failed short-circuited; this led to the disconnection of power source 12 from the bus by its GCU. The BTCs 32, 34 may once again be de-activated (opened) to isolate the fault. Power bus bar 24 may be de-energized. The power to all loads 16 supplied by power bus bar 24 will be lost.

Some present aerospace applications have the control logic of the BTCs 32, 34 implemented in the GCUs 38, 40, while most applications have the logic implemented in the CONTROL DEVICE 46.

In applications where the electrical power system 10 has its electrical power generators operating at Constant Frequency (CF) such as that found on the Boeing 747, the system may operate with BTCs 32, 34 closed. Thus power sources 12, 14 share the burden of supplying power to the downstream loads 16, 18. Hence in a CF power system, it may not be necessary to isolate the channels in normal operation as shown in FIG. 1. In the CF power system, power source faults and power bus faults may be handled in a manner similar to the VF power system shown in FIGS. 1 and 3.

There are a number of disadvantages with the BTC control of electrical power system 10 shown in FIGS. 1-3. The control of the BTCs 32, 34 is relatively complex to insure safe power handling and transfer.

In more detail, there are two different cases which require these control algorithms.

Case 1: each power source feeds its own bus, where three control algorithms are needed as follows:
  a) control algorithm for the detection of the transfer condition/request;
  b) analysis algorithm for the isolation of the cause of failure; if the generator disconnect was due to an over current fault, the closure of the BTC needs to be inhibited since this points to a bus failure that could propagate to generator 2; and
  c) protection algorithm (differential fault protection—DP) to inhibit the closure of the BTC in the case a fault to ground is detected on the cable connecting between bus bar 1 and bus bar 2.

Case 2: One generator feeds both busses, where two control algorithms are needed as follows:
  a) control algorithm to isolate an over current fault to the specific bus; this algorithm usually involves the opening of the BTC, monitoring the over current by the GCU; with the assumption that generator 2 feeds both bus bars, if the over current disappears after the opening of the BTC, it means that the fault is on bus bar 1, therefore the BTC connection must be disabled, if the over current persists, generator 2 must be disconnected from the bus; and
  b) protection algorithm (differential fault protection—DP) to open the BTC in the case of a fault to ground is detected on the cable connecting between bus bar 1 and bus bar 2.

The implementation of the above algorithms requires use of current measurement devices, i.e. current transformers (CT), optimization for the allocation and coordination of control between GCU and CONTROL DEVICE.

The electric power system 10 shown in FIGS. 1-3 is a relatively simple example since it addresses a system including only two generating source. In practice, the electrical power system may be more complex, including multiple generators and external power sources. The principle of control remains the same; however, the control algorithms become even more complex.

As can be seen, there is a need for a simple and efficient way to handle the failure of a power source in electric power systems having multiple power sources. There is also a need for a simple and efficient way to control bus tie contactors during various failure conditions in electrical power systems.

SUMMARY OF THE INVENTION

In one aspect of the present invention, an electrical power distribution system comprises a first primary distribution panel (PDP) connected to a first source of electrical power; a second PDP connected to a second source of electrical power, the second PDP being connected to the first PDP by a 'cross-tie' conductor; a first electronic load control unit (ELCU) receiving signals corresponding to the flow of current in the cross-tie conductor through the first PDP; a second ELCU receiving signals corresponding to the flow of current in the cross-tie conductor through the second PDP; and the first and second ELCUs responding to a fault condition in the conductor by interrupting the flow of electrical power between the first and second PDPs.

In another aspect of the present invention, an electrical power distribution system comprises first source of electrical power connected to a first primary distribution panel (PDP); a second source of electrical power connected to a second PDP; an electrical load; a first electronic load control unit (ELCU) having a first contactor connected to the first source of electrical power, said first contactor having open and closed modes; a second ELCU having a second contactor connected to the second source of electrical power, said second contactor having open and closed modes; a conductor connected to the second contactor and to the electrical load; and the first ELCU sensing a current in a cross-tie conductor from the first source and in response thereto, opening the first contactor and at least one of the first and second ELCUs closing the second contactor to permit electrical power to flow from the first PDP load said cross-tie conductor.

In accordance with a further aspect of the present invention, a circuit for protecting an electrical power distribution system comprises first power distribution panel (PDP) connected to a first source of electrical power; a second PDP connected to the first PDP by a conductor; a three phase electrical load connected to the first PDP; a first ELCU receiving signals corresponding to the flow of current through each of the three phases of the three phase electrical load; a second ELCU receiving signals corresponding to the flow of current through the second PDP; and at least one of the first and second ELCUs responding to the detection of a phase imbalance between the phases of current through the three phases by disconnecting the first source of electrical power.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be advantageously used in electric power systems, including aerospace electrical primary distribution panels (PDP). Embodiments of the present invention may provide for the protection of outgoing power to system loads and/or other PDPs that may have lost their dedicated source of power. Embodiments of the present invention may use an electric load control unit (ELCU) in place of a Bus Tie Contactor (BTC) commanded contactor. Prior art electric power systems relied on BTCs for this protection function. Also, embodiments of the present invention may use ELCUs for protection of both electrical load feeders and for bus cross tie feeders. Prior art electric power systems only use ELCUs for electrical load feeder protection.

Embodiments of the present invention may replace the BTC control algorithms located in the Control Device or GCU with the protection algorithms located as standard features in the ELCU, which eliminates additional wiring and complexity. Embodiments of the present invention also may provide an over current algorithm in the ELCU. Prior art power systems used a CONTROL DEVICE having a BTC differential algorithm and had an over current algorithm that was functionally split/implemented between GCUs and BPCU.

Figure 4:
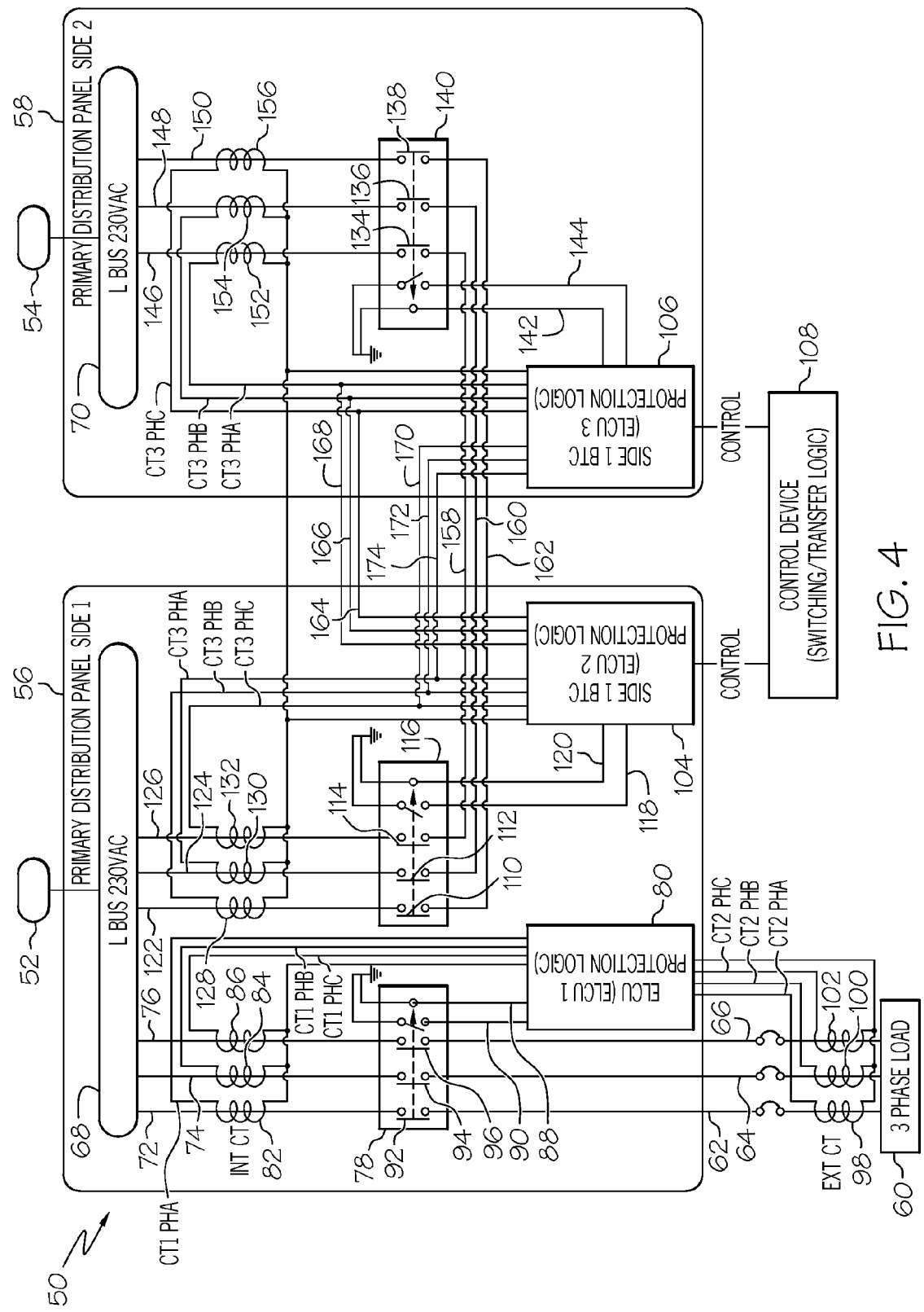
FIG. 4 is a block diagram of an electric power system in accordance with one embodiment of the present invention.

FIG. 4 shows a block diagram of an electric power system 50 which insures the distribution and protection of outgoing power to system loads. The electric power system 50 includes first and second power sources 52, 54, which may comprise electrical generators. Each power source 52, 54 may supply electric power to a primary distribution panel (PDP) 56, 58, which in turn may supply electric power to one or more loads 60. Loads 60 may comprise three phase loads connected to the PDP 56 by three feeder lines 62, 64 and 66.

Power from the power sources 52, 54 may be transferred to power bus bars 68, 70 respectively, residing in the PDPs 56, 58. Power bus bar 68 may be connected to a first contactor 78 by means of three lines 72, 74 and 76. Contactor unit 78 may include three contacts 92, 94 and 96 connected to lines 72, 74 and 76 on an input side and to the feeder line 62, 64 and 66 on the output side.

A first ELCU 80 may be connected to the first contactor 78 though lines 88 and 90 which may carry controls signals that control the state of contactors 92, 94 and 96. First ELCU 80 may also be coupled to the lines 72, 74 and 76 through three current transformers (CT) 82, 84 and 86, which sense the current in lines 72, 74 and 76. Likewise, first ELCU 80 may be coupled to lines 62, 64 and 66 through CTs 98, 100 and 102, which sense the current in lines 62, 64 and 66.

First ELCU 80, (as well as second and third ELCUs 104, 106 described below) may be a conventional ELCU. It will be appreciated that ELCUs are common devices used in the aerospace industry for protecting electrical feeders. ELCU 80 may comprise a power contactor, control logic (using discrete components, application specific integrated circuitry or microprocessor) and current sensors (e.g. current transformers or Hall Effect sensors).

ELCU's commonly are provided with built-in "intelligence" features such as:
  Overload current protection based on an inverse over-current and time function.
  Programmability for over-current protection usually via pins on the ELCU connector.
  External command to open circuit allows remote control to by-pass the built-in protection by hardwire or data bus.
  Options to implement differential current trip protection via connection to remotely located current sensors.
  Phase imbalance protection trip when one of the phase current becomes higher or lower than the rest by a predetermined amount.
  Output signal for load current monitoring by hardwire or by data bus.

ELCUs are available for the aerospace market from the following companies:
  Leach (Esterline), part numbers WE-X2YN, ZE-X9YN
  Hartman (Tyco), part numbers BPE-494
  Honeywell (using Hartman as one of the power contactor suppliers), 3B-39-1,-2; 3B-41-1,-3; 3B50-1; 3B50-2-D; 1592944; 1593921-1; 1593921-2; 1593926-0102
  Sundstrand, part numbers 946F029-1, 962C526-1
  Eaton Aerospace Remote Control Circuit Breakers, part number SM600BA100N1

The function of the first ELCU 80 may be to control the states of the contactor 78 so that power to the loads 60 may be switched on or off depending on processing the current information sensed by CTs, 82, 84, 86, 98, 100 and 102. Electric power system 50 also may include second and third ELCUs 104, 106 connected to a control device 108. Device 108 may be a CONTROL DEVICE or GCU for the purpose of the control of the status (ON/OFF) of the ELCUs, i.e., detection of failure conditions of the power sources that may require the closure of the two ELCUs that operate now, as proposed by the present invention in the role of BTCs. Second ELCU 104 may be located in PDP 56 and may control the state of contactor 116 through control lines 118 and 120. Second contactor 116 includes contacts 110, 112 and 114 and may be connected to the first power bus 68 through lines 122, 124 and 126. Second ELCU 104 may be coupled to L BUS 230VAC via lines 122, 124 and 126 and receive line current information through Current Transformers CTs 128 130 and 132.

Third ELCU 106 may be located in PDP 58 and may control the state of contactor 140 through control lines 142 and 144. Third contactor 140 may includes contacts 134, 136 and 138 and may be connected to the second power bus 70 through lines 146, 148 and 150. Third ELCU 106 may be coupled to R BUS 230VAC bus via lines 146, 148 and 150 and receive line current information through Current Transformers—CTs 152, 154 and 156. The lower side of contactor 116 may be connected, through bus cross-tie feeders 158, 160 and 162, to the lower side of contactor 140. The second ELCU 104 may sense the state of CTs 152, 154 and 156 in the PDP 58 through lines 164, 166 and 168. Likewise the third ELCU 106 may sense the state of CTs 128, 130 and 132 in the PDP 56 through lines 170, 172 and 174. It is noted that, as shown in FIG. 4, the outputs of the CTs 128, 130, 132, 152, 154 and 156 may be connected differentially, allowing their use for differential protection implementation and over current protection.

Figure 1:
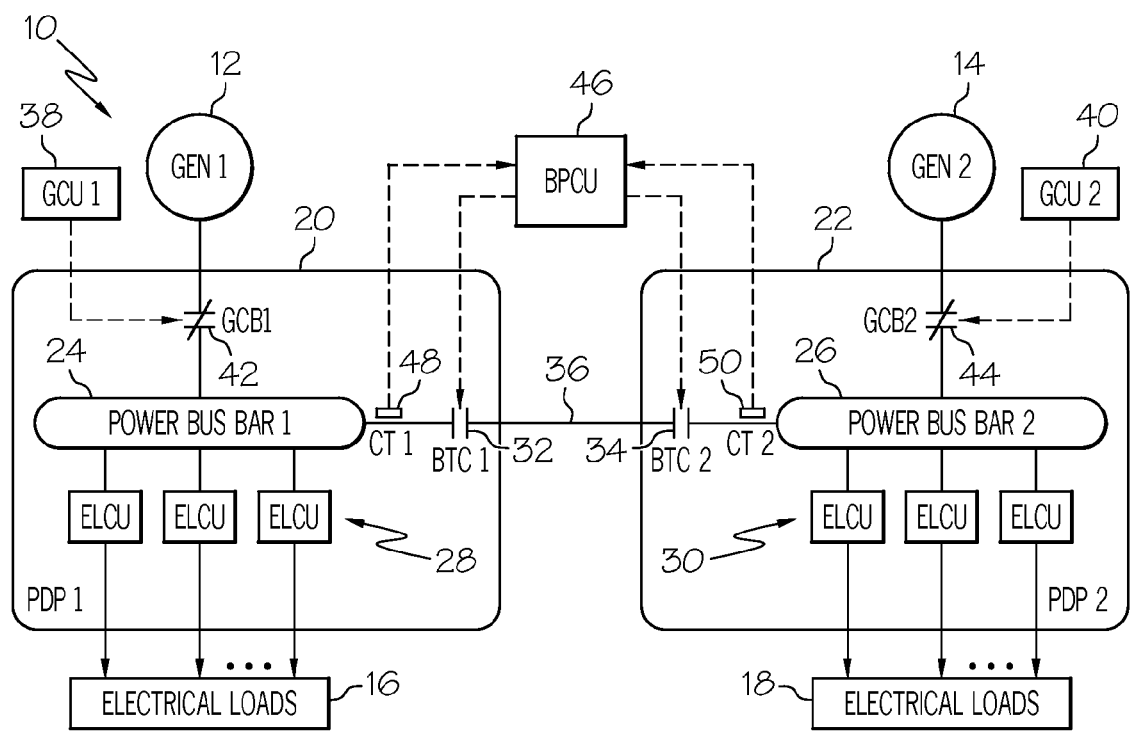
FIG. 1 is a block diagram of an electric power system in accordance with the prior art.
Figure 2:
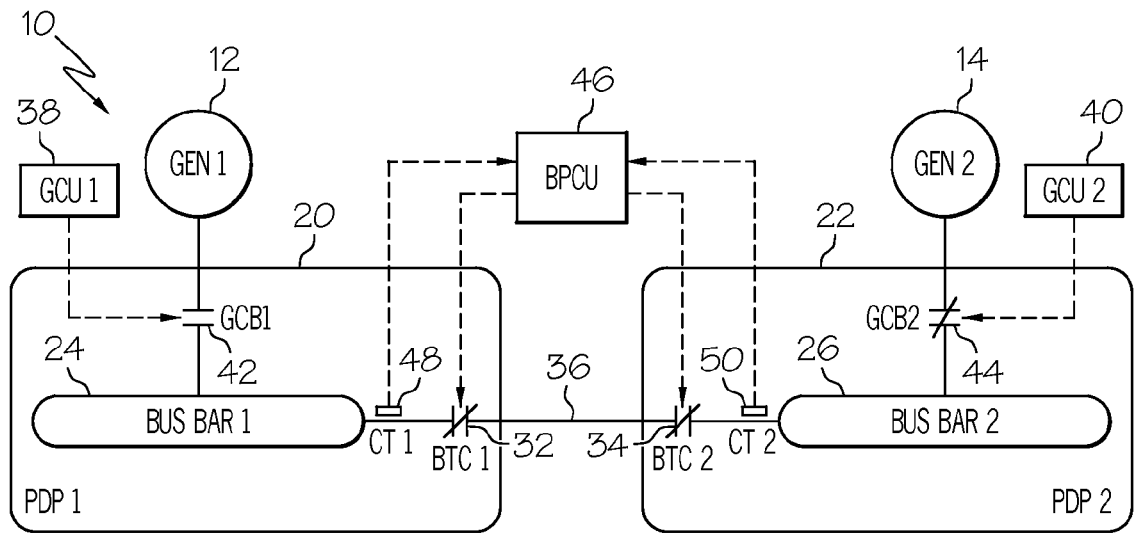
FIG. 2 is a block diagram of the electric power system shown in FIG. 1 in a first failure mode.
Figure 3:
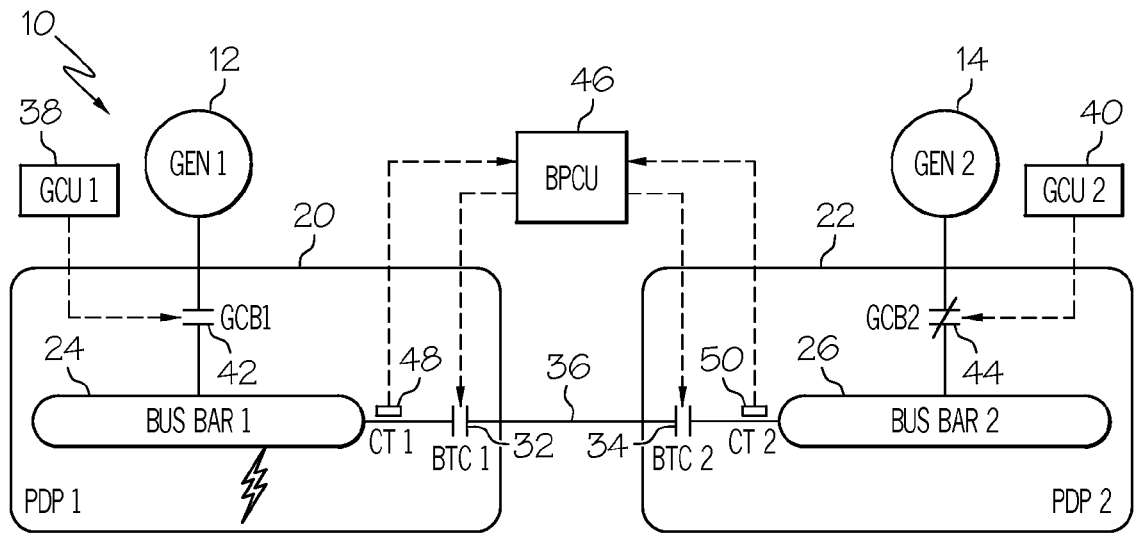
FIG. 3 is a block diagram of the electric power system shown in FIG. 1 in a second failure mode.

The operation of second and third ELCUs 104, 106 and control device 108 may be similar to the operation of the CONTROL DEVICE 46 and BTCs 32, 34 as shown in FIGS. 1-3. In particular, in a normal mode, second and third ELCUs contactors 104 and 106 are open. In this state the two PDPs 56, 58 may operate independently. In a failure mode, where power source 52 fails, control device 108 may sense this condition and close ELCU contactors 116 and 140. In this way, power from source 54 may directed across feeders 158, 160 and 162 to PDP 52 where it can supply electrical power to the load 60.

ECLUs 80, 104 and 106 along with the control device 108 may be provided with the following algorithms as standard features: algorithm (a) differential protection to protect against faults to ground; algorithm (b) over current protection, and algorithm (c) missing phase protection. By the use of the standard algorithms in ECLUs the control of the electric power system is simplified as compared to the prior art. In particular, algorithm (a) may replace the prior art protection algorithm that inhibits the closure of the BTC in the case where a fault to ground is detected on the feeders 158, 160 and 162 connecting power bus bar 68 to power bus bar 70 for circuits where each power source feeds its own bus. Algorithm (b) may replace the prior art analysis algorithm for the isolation of the cause of the failure described above, as well as the prior art control algorithm used to isolate an over current fault to the specific bus in cases where one power source feeds both busses. Algorithm (c) may enhance the protection capabilities of the control due to the fact that it does not permit operation of the loads connected to a power bus bar with a missing phase.

Thus, it may be seen that the present invention may provide a solution for the implementation of the bus bar connections via the use of ELCUs with integral control instead of classic contactors with control allocated to GCUs or CONTROL DEVICE. Also, the present invention takes full advantage of the features already built in as part of ELCU design to simplify the architectures for an aircraft electric power system, and to implicitly optimize the control logic during normal and abnormal modes of operation. The use of a common device, the ELCU commanded contactor in place of a BTC allows the achievement of a modular design. As such a single device, the ELCU can be used to protect all output feeders from a PDP; both the supply feeders and the bus cross tie feeders. The present invention can allow a modular implementation of power distribution panel by using common devices for both, power distribution and cross tie connections. The present invention also can allow for the simplification of control algorithms located in GCUs and CONTROL DEVICEs including the downgrading of the redundancy levels required for implementation of this hazardous functionality. The present invention can enhance the electrical power system protections by adding the missing phase protection of a bus bar.

It should be understood, of course, that the foregoing relates to exemplary embodiments of the invention and that modifications may be made without departing from the spirit and scope of the invention as set forth in the following claims.

We claim:
1. An electrical power distribution system comprising:
  a first primary distribution panel (PDP) connected to a first source of electrical power;
  a second PDP connected to a second source of electrical power, said second PDP being connected to said first PDP by a cross-tie conductor;
  a first electronic load control unit (ELCU) and an auxiliary ECLU in processing communication with said first ELCU, wherein both ELCUs receiving signals corresponding to a first flow of current in said cross-tie conductor through said first PDP;
  a second ELCU receiving signals corresponding to a second flow of current in said cross-tie conductor through said second PDP; and said first, or alternatively said auxiliary ELCU, and second ELCUs responding to a fault condition in said conductor by interrupting a third flow of electrical power between said first and second PDPs.

2. The electrical power distribution system of claim 1 further comprising:
   a first current sensor sending signals corresponding to said first flow of current from said first source through said first PDP; and
   a second current sensor sending signals corresponding to said second flow of current from said second source through said second PDP.

3. The electrical power distribution system of claim 2 wherein said second current sensor sends signals corresponding to the flow of current from said second source to said first ELCU.

4. The electrical power distribution system of claim 2 wherein said first current sensor sends signals corresponding to the flow of current from said first source to said second ELCU.

5. The electrical power distribution system of claim 2 wherein said first and second current sensors are current transformers.

6. The electrical power distribution system of claim 1 further comprising a third ELCU connected to said first PDP.

7. The electrical power distribution system of claim 1 wherein said first and second sources of electrical power are sources of variable frequency electrical power.

8. The electrical power distribution system of claim 1 wherein said first and second sources of electrical power are sources of constant frequency electrical power.

9. An electrical power distribution system comprising:
   a first source of electrical power connected to a first primary distribution panel (PDP);
   a second source of electrical power connected to a second PDP;
   electrical load;
   said first and second source of electrical power each having at least one power bus associated with them such that either of said first or second source of electrical power can feed both busses as appropriate;
   a first electronic load control unit (ELCU) having a first contactor connected to said first source of electrical power, said first contactor having open and closed modes;
   an auxiliary ELCU having a first contactor connected to said first source of electrical power, said first contactor having open and closed modes;
   a second ELCU having a second contactor connected to said second source of electrical power, said second contactor having open and closed modes;
   a conductor connected to said second contactor and to said electrical load; and
   said first or alternatively said auxiliary ELCU sensing a current in a cross-tie conductor from said first source and in response thereto, opening said first contactor and at least one of said first and second ELCUs closing said second contactor to permit electrical power to flow from said second source to said first PDP through said cross-tie conductor.

10. The electrical power distribution system of claim 9 further comprising a current sensor connected to said first ELCU.

11. The electrical power distribution system of claim 9 further comprising a third ELCU and a third contactor connecting said first source to said load, said third contactor having open and closed modes.

12. The electrical power distribution system of claim 11 further comprising a control device connected to said second and third ELCUs, said control device determining the response of said second and third ELCUs to said sensed current.

13. The electrical power distribution system of claim 11 further comprising:
   a first power bus bar connected to said first source of electrical power and to said first contactor; and
   a second power bus bar connected to said second source of electrical power and to said second contactor, wherein said first ELCU controls said mode of said first contactor.

14. The electrical power distribution system of claim 13 wherein said third contactor is connected to said first power bus and third ELCU is connected to and controls said mode of said third contactor.

15. A circuit for protecting an electrical power distribution system comprising:
   a first power distribution panel (PDP) connected to a first source of electrical power;
   a second PDP connected to said first PDP by a conductor;
   a three phase electrical load connected to said first PDP;
   a first ELCU receiving signals corresponding to the flow of current through each of the three phases of said three phase electrical load;
   an auxiliary ELCU receiving signals corresponding to the flow of current through each of said three phases of said three phase electrical load;
   a second ELCU receiving signals corresponding to the flow of current through said second PDP; and
   at least one of said auxiliary, first and second ELCUs responding to the detection of a phase imbalance between said flow of current through said three phases by disconnecting said source of electrical power selectively such that power to said electric load is switched on or off depending on processing current information so that operation is not permitted along any path when a missing phase is detected.

16. The circuit of claim 15 wherein said at least one of said first and second ELCUs respond to said detection of a phase imbalance when said follow of current through one of said three phases is higher or lower than said flow of current through said other two phases by a predetermined amount.

17. The circuit of claim 15 further comprising a second source of electrical power connected to said second PDP.

18. The circuit of claim 15 further comprising three current transformers, each connected to one of said three phases of said load.

19. The circuit of claim 15 further comprising a third ELCU connected to said first PDP.

20. The circuit of claim 19 further comprising a control device connected to and controlling said second and third ELCUs.

* * * * *